Figure 3:
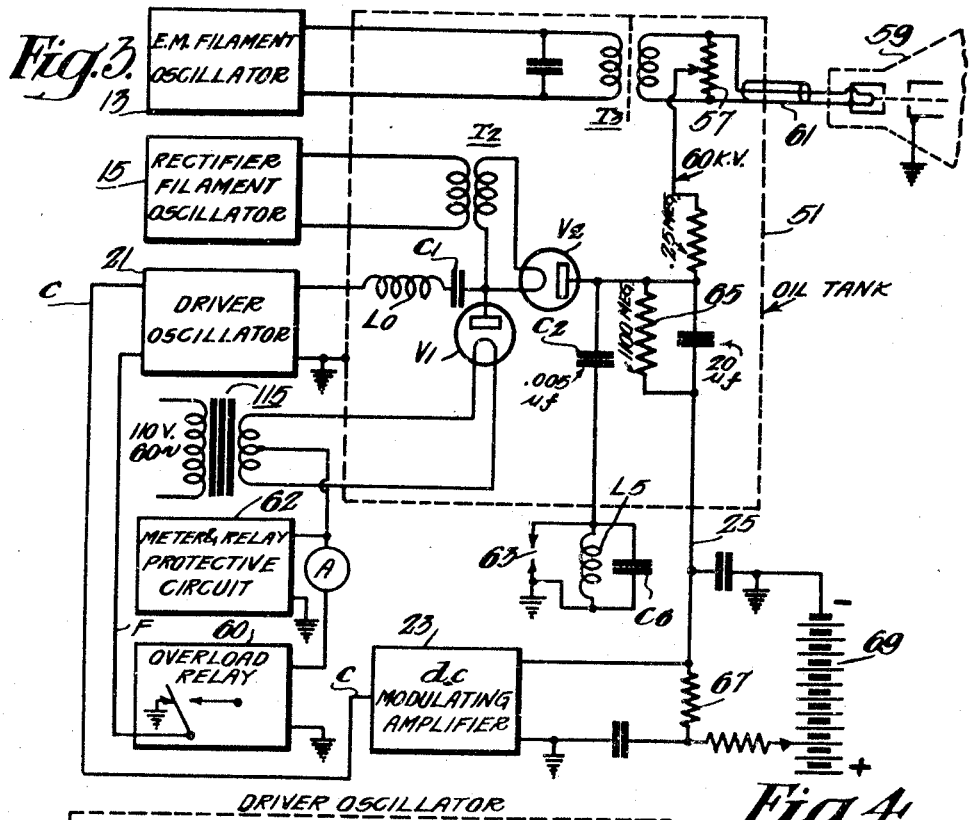

April 22, 1947. A. W. VANCE 2,419,428
POWER SUPPLY FOR ELECTRON MICROSCOPES
Original Filed Nov. 15, 1940   3 Sheets-Sheet 1
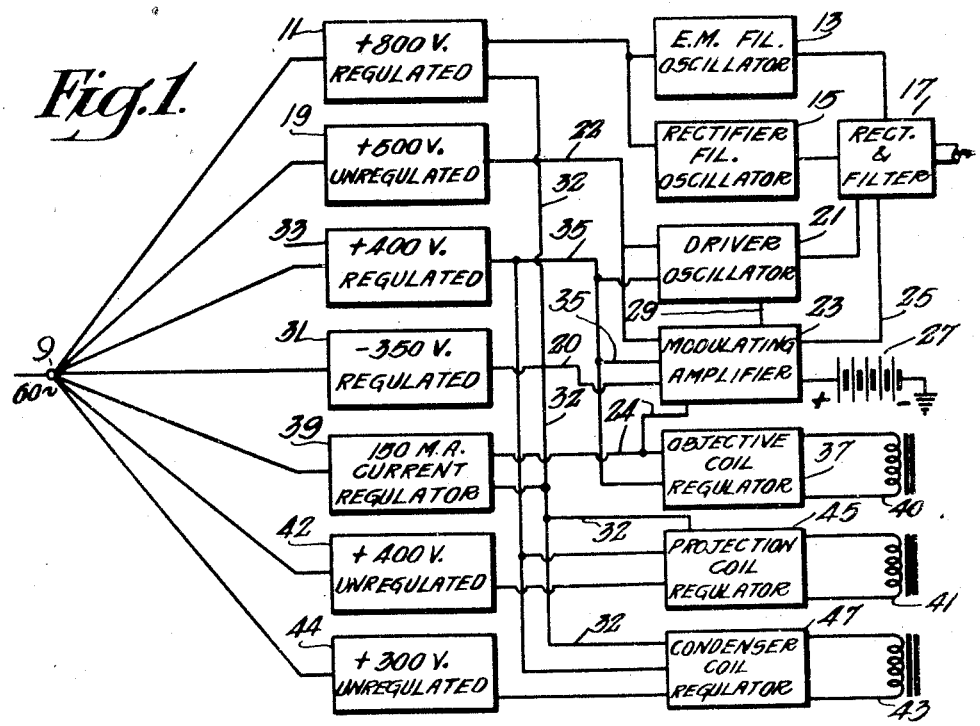
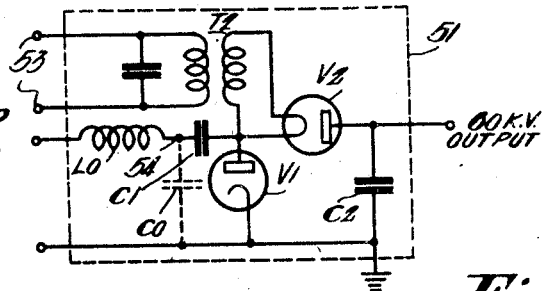
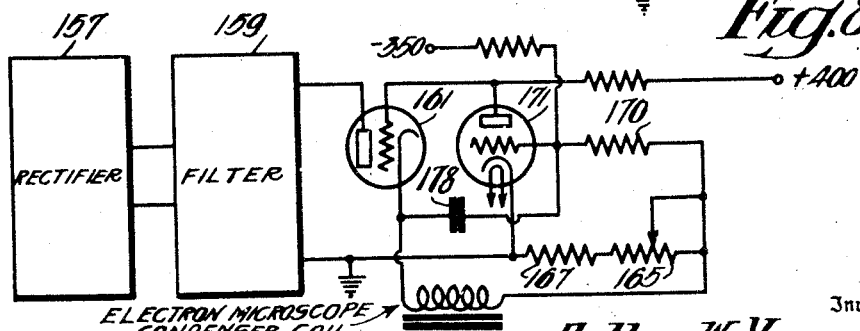
Inventor
Arthur W. Vance
By
Attorney April 22, 1947.     A. W. VANCE     2,419,428
POWER SUPPLY FOR ELECTRON MICROSCOPES
Original Filed Nov. 15, 1940     3 Sheets-Sheet 3
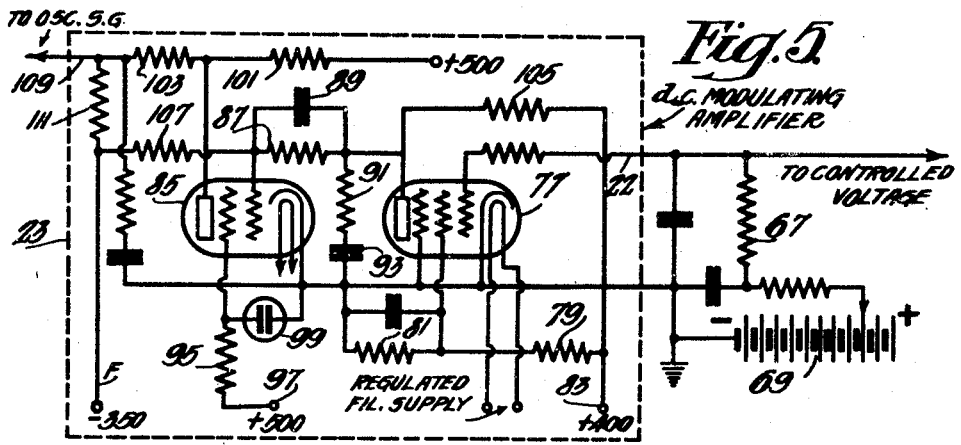
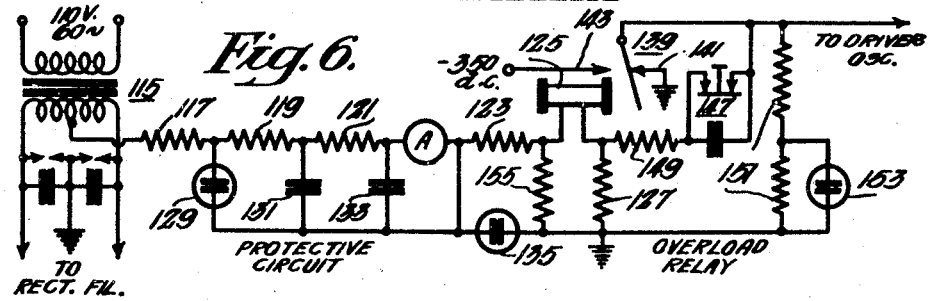
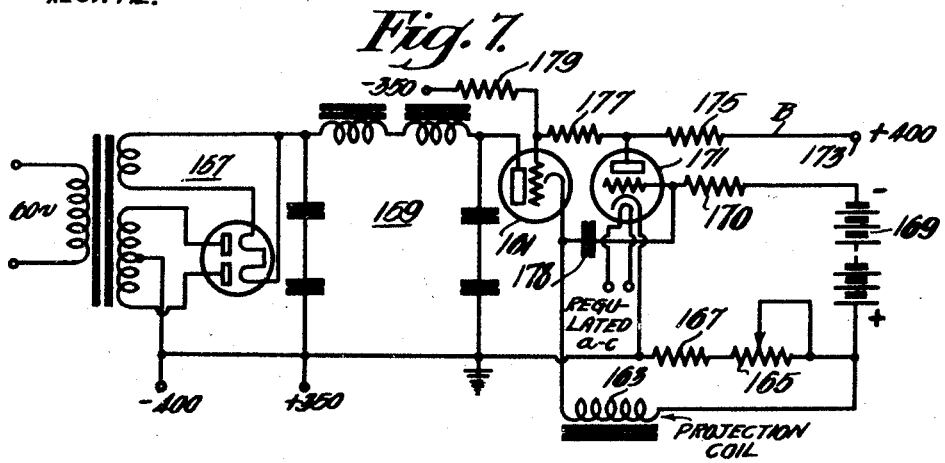
Inventor
Arthur W. Vance
Attorney

Patented Apr. 22, 1947

2,419,428

UNITED STATES PATENT OFFICE 2,419,428

POWER SUPPLY FOR ELECTRON MICROSCOPES

Arthur W. Vance, Cranbury, N. J., assignor to Radio Corporation of America, a corporation of Delaware Application April 28, 1942, Serial No. 440,771, which is a division of application Serial No. 365,750, November 15, 1940, now Patent No. 2,302,900, dated November 24, 1942. Divided and this application April 17, 1943, Serial No. 483,487

2 Claims. (Cl. 171—312)

The subject invention relates to power supply systems for electronic devices and has for its principal object the provision of an improved method and means for producing a highly stabilized source of voltage for use with the electron microscope whereby greatly improved performance may be obtained.

This application is a division of applicant's copending U. S. application, Serial Number 440,771, filed April 28, 1942, which is a division of U. S. application, Serial Number 365,750, filed November 15, 1940, upon which U. S. Patent 2,302,900 was granted to applicant November 24, 1942.

The development of the electron microscope has presented new problems in the design of high voltage power supplies and, in the design of current regulating systems for the various electromagnetic coils which constitute the magnetic lens system of the microscope. In order to produce a beam of high velocity electrons, an electron gun is utilized which is energized with a direct current voltage which may be as high as 100 kilovolts. The current load of the high voltage source is of the order of 1 milliampere, and the problem, therefore, is one of voltage stability. The magnetic lenses require currents of the order of 400 milliamperes which likewise must be maintained constant over short periods.

The stability of the voltage supply system for an electron microscope is measured over the period of time required to properly expose a photographic plate used to record the images. In practice, the longest exposure is approximately 30 seconds. Consequently, the voltage supply system must not vary appreciably within this period, since slight variations in the electron speed or in the focus of the magnetic fields will defocus the electron image and distort the photograph.

It is also necessary to consider the short-time constancy of the power supply system since this limits the resolution of the microscope. Theoretical calculations based on a resolving limit of 10 Angstrom units indicate that the most critical current must not vary more than .004 of one percent and that the high voltage should not vary more than .006 of one percent.

It is well known that the electron beam must be thoroughly shielded from all external fields. The difficulty of shielding magnetic fields produced by 60 cycle currents has heretofore necessitated the use of direct current to supply power to the filament of the high velocity electron gun. Since the cathode is normally operated at a high negative potential, with the anode grounded, the filament supply is necessarily at a high voltage with respect to ground. It is a further object of this invention to eliminate the necessity of supplying direct current for the electron gun by energizing the filament with radio frequency currents. A still further object of this invention is to provide an improved high voltage rectifier circuit having a feedback stabilizer which permits the required high voltage to be obtained with less equipment and fewer parts than heretofore been required, thus greatly reducing the cost and size of the power supply system. Still further objects of the present invention are to provide an improved automatic relay and protective circuit; to provide an improved oscillator for supplying the radio frequency currents utilized in energizing the high voltage rectifier; and to provide improved current regulators for use in conjunction with the microscope lenses.

Briefly, these objects are accomplished by employing a source of radio frequency currents coupled to a voltage doubling rectifier circuit in which the filament of one of the rectifier tubes is energized with radio frequency currents, thus facilitating filtering problems, deriving a potential corresponding in amplitude to the rectified output, and utilizing this potential to control the output of the oscillator supplying the high frequency currents to the rectifying system.

Figure 4:
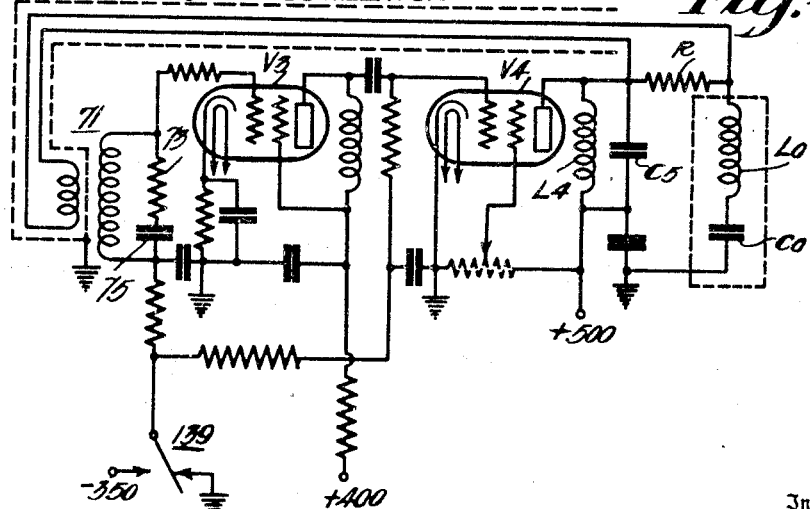

This invention will be better understood from the following description when considered in connection with the accompanying drawings in which Figure 1 is a block diagram of the essential elements of a complete power supply system for an electron microscope; Figure 2 is an equivalent circuit diagram illustrating the operation of the high voltage rectifier and filter system; Figure 3 is a simplified circuit diagram of the system including the high voltage rectifier; Figure 4 is the circuit diagram of the driver oscillator which supplies high voltage radio frequency currents to the high voltage rectifier; Figure 5 is the circuit diagram of a D.-C. modulating amplifier; Figure 6 is a circuit diagram of a protective circuit including an overload relay; Figure 7 is the circuit diagram of a regulated current supply suitable for use in conjunction with the electromagnets of the lens system; and Figure 8 is an alternative current regulating system.

The power supply system

Referring to Fig. 1, a complete power supply system for an electron microscope is illustrated in block diagram form. Power is derived from a 60 cycle power line 9 and applied to a number of regulated power units which energize various components of the system and which are designed to have output voltages which are determined by their intended use. The regulated power supply 11 energizes a pair of low frequency oscillators 13 and 15 which are utilized, respectively, to energize the filament of the electron microscope and the filament of one of the high voltage rectifiers. The high frequency-high voltage rectifier and filter circuits are represented by the block 17 and will be described in detail hereinafter. Another power unit 19, which may be unregulated, energizes a driver oscillator 21 which generates high voltage radio frequency currents for the high voltage rectifier. A modulating amplifier 23 is energized through a connection 22 by the unregulated power unit 19 and is also supplied with a voltage over a lead 25 which is proportional to the rectified output voltage. This voltage is compared to that supplied to the modulated amplifier by a standard battery 27, in a circuit which will be described in detail hereinafter, to produce an output control voltage which is utilized to control the amplitude of oscillation of the driver oscillator 21. This control connection is illustrated by lead 29. The amplifier is also connected by a lead 20 to a regulated power source 31 which supplies a negative voltage of the order of −350 volts, the purpose of which is to be described later.

Another regulated power unit 33 supplies a direct voltage of the order of +400 volts to the driver oscillator 21 and to the modulating amplifier 23 through a lead 35. In order to achieve the highest degree of accuracy, the modulating amplifier 23 and, in addition, a current regulator 37 for the objective coil are supplied with a regulated current through connection 24 from a source 39 which is used to energize the filaments of certain of the tubes of these devices. Regulation in the current regulator 39 is achieved by utilizing the −350 volts obtained from the regulated power supply 31 by a connection 32 as a standard reference voltage, in a manner which will be described hereinafter. The projection coil and the condenser coil 41 and 43 are energized by current regulators 45 and 47, which derive power from power supplies 42, 44, respectively, both regulators having a connection over conductor 32 to the regulated power supply 31. A particular advantage of this system of interconnection is that one power supply which is carefully regulated controls the output voltages of the other power supply units, and control by a regulated or standard voltage is effectuated in a much more economical manner than by any other method.

*The high voltage rectifier*

Referring now to Fig. 2, a circuit diagram of the high voltage rectifier system is shown. Since an extremely high voltage is produced, the high voltage equipment has been mounted in an oil tank 51 which not only protects the user from harm, but also decreases the danger of accidental flashover or short circuits. The driver oscillator 21 is connected to a series resonant circuit comprising an inductance L0 and a capacitance C0, the latter representing the effective lumped capacity between the point 54 and ground due to the primary of transformer T2, and the rectifier tubes V1 and V2 in series with the capacitor C1. The cathode of the first rectifier V1 is grounded, while its anode is connected to the inductor L0 through the coupling capacitor C1 and also the cathode of the second rectifier V2. The anode of the second rectifier is connected to the cathode of the high velocity electron gun of the microscope and is the source of high voltage direct potential whose polarity is negative with respect to ground.

The filament of the first voltage rectifier V1 is supplied from a conventional 60 cycle line, while the filament of the high voltage rectifier V2 is obtained from the filament oscillator 13 which is connected to input terminals 53, the circuit including a coupling transformer T2 having an untuned secondary and a tuned primary.

Radio frequency actuation of the high voltage rectifier has a number of advantages over the use of a conventional 60 cycle alternating power source for the production of high voltages of great constancy at low current drains. For example, much smaller filter condensers are required for a given ripple output. This means that the stored energy in the filter circuit is very much less than that of the usual 60 cycle "brute force" filter system. The importance of this is that in case of a flash-over in the high voltage circuit, due to a loss of vacuum in the microscope, for example, the stored energy is not sufficient to burn up the equipment, as was the case in the earlier microscopes. Since resonant circuits are used, the ripple fed through the rectifier capacitor is sinusoidal and consequently can be resonated out to a large degree. Furthermore, by using low loss coils in the resonant circuit, an extremely high impedance may be realized which occupies but a small space and is extremely light in weight as compared to an equivalent impedance at the conventional power frequency. Also the exciting power required by such a coil is greatly reduced.

The use of radio frequency high voltage power supply also improves the operation of the output control system. When the control is operated on the low voltage input side of the rectifier, as is desirable, the speed of control is limited by the frequency of the supply. Consequently, this limitation is negligible where the supply voltage is a radio frequency voltage.

The use of radio frequency to energize the cathode or filament of the high velocity electron gun has two important advantages. In the first place, the microscope may be readily shielded from the stray high frequency fields which are produced, and this result is aided by the fact that no 60 cycle high voltage transformers are required which have very large external fields. In the second place, the use of radio frequency eliminates the necessity for employing bulky storage batteries or their equivalent.

The operating frequency for the rectifier system is not critical. The problem is essentially that of obtaining the required output voltage with a minimum exciting power. This, of course, requires obtaining the maximum resonant impedance of the high voltage coil. The resonant impedance is given by the formula:

$$Z = \frac{Q}{2\pi f C}$$

where C is the distributed capacity of the coil plus the rectifier interelectrode capacities plus other stray capacities such as capacity from the primary to the secondary of the filament transformer T2. It is obvious that C should be kept to a minimum, and with C at a minimum, Z may only be raised by decreasing $f$ or by increasing Q, where Q is the well known efficiency factor:

$$\frac{\omega L}{R_L + R_C}$$

and $R_L$ and $R_C$ are the effective series A.-C. resistances of L and C, respectively. In the frequency region from approximately 20 kc. up to several hundred kc., the maximum Q possible in a coil of given volume is more or less independent of frequency; thus, the coil should, in general, operate below 50 kc.

The rectifier circuit is seen to be of the type wherein the inverse voltage of the half wave rectifier V1 is rectified by V2, thereby charging the output capacitor C2 to a voltage nearly equal to twice the peak voltage which appears across the inductance L0. It is to be noted that one side of the input circuit is grounded and that no primary winding is required on the high voltage coil.

The filament transformer T2 has a low interwinding capacity which is preferably of low power factor. The primary and secondary windings must be spaced sufficiently to withstand the peak voltage output, and, as a result, a large amount of energy must be stored in the tuned primary in order that the secondary may absorb the power necessary to excite the filament. Preferably, the tuned primary of transformer T2 constitutes the tank circuit of the driving filament oscillator. The size of the secondary is selected to match the impedance of the filament load and to provide the desired voltage. The filament current may be controlled conveniently by varying the frequency of the oscillator 15.

Fig. 3 shows the rectifier circuits connected to the other elements of the power supply system. It will be noted that the negative voltage for the electron gun cathode obtained from the output of rectifier V2 is applied to a center tapped resistor 57 connected across the secondary of the transformer T3 which supplies radio frequency current to the filament of the electron gun 59. The filament, as a whole, is 60 kilovolts below ground potential and must therefore be carefully insulated. The radio frequency current supplied by the filament oscillator 13 is applied to the filament through a coaxial cable 61.

It will be noted that the filter capacitor C2, .005 microfarads, for example, is connected to ground through a parallel connected coil L5 and condenser C6. The values of these reactors are such that at the operating radio frequency, effective inductive reactance of L5 and C6 resonates with capacitor C2 and forms an effective ground for ripple voltages appearing in the output circuit. At a higher frequency, for instance, midway between the fundamental and second harmonic L5 and C6 become parallel resonant, presenting a high impedance, but as there is no ripple at this frequency anyway, no harm results. At higher frequencies including the second harmonic, the shunt capacitor C6 in series with the output capacitor C2 provides an effective ground. A spark gap 63 is connected across the shunt reactors L5 and C6 in order to discharge voltage surges without causing a breakdown of the elements.

High voltage regulator

The amplitude of the rectified direct current is controlled by a circuit including the D.-C. modulating amplifier 23 which controls the driver oscillator 21, a voltage divider comprising a high resistance capacity-compensated high voltage resistor 65, 1100 meg., and a relatively low resistance resistor 67, 10 meg., serially connected between the high voltage source and the regulator. The lower end of resistor 67 is bypassed to ground and connected through an isolating resistor to an adjustable tap on a standard battery 69, the negative terminal of which is grounded. The standard voltage produced by the battery 69 is therefore compared to the divided voltage appearing across resistor 67, so that no input voltage is applied to the amplifier 23 when the divided voltage obtained from the high voltage output is exactly equal to that of the standard battery. By varying the taps on the standard battery 69, the output voltage may be controlled, for example, in 5 kv. steps from 30 to 60 kv.

The details of the driver oscillator which supplies high voltage for the rectifier tubes V1 and V2 is shown in Fig. 4. Since the resonant frequency of the series resonant inductor L0 and C0 included within the oil tank 51 varies considerably with temperature, a master oscillator-power amplifier is impractical without automatic frequency control to keep it at resonance. It is therefore proposed to utilize a self-oscillating circuit whose frequency is determined wholly by the resonant frequency of the load L0, C0. This oscillator must also be capable of modulation over a considerable range in order to provide control over the output voltage. The circuit utilized comprises a two-stage oscillator including tubes V3 and V4, the output of the latter being coupled to the input of the former by a conventional impedance coupling system, tube V4 being shunt fed through inductor L4 and coupled to the resonant circuit load through a small series resistance R. Inductor L4 is resonated at the operating frequency by a capacitor C5. A feedback voltage is obtained by the drop across resistor R, the terminals of which are connected to the primary of a shielded transformer 71, the secondary of which is coupled to the input of the first oscillator tube V3. The transformer 71 preferably has a broad frequency response, this being accomplished, for example, by a damping resistor and capacitor 73 and 75. The feedback gain is sufficient only to sustain oscillation at or very near the resonant frequency of the load L0, C0.

The amplitude of oscillation is controlled by varying the screen grid potential of the output tube V4. This is illustrated in Fig. 4 by the potentiometer connection shown in dotted lines, the potentiometer representing the control bias derived from the D.-C. modulating amplifier 23. The details of this connection are illustrated in Fig. 5. The tank circuit L4, C5 has a high L/C ratio and it therefore exerts only slight control over the frequency of oscillation. Its principal function is to maintain reasonably sinusoidal voltage conditions in the plate of V4.

Referring to Fig. 5, a unique D.-C. amplifier is illustrated suitable for use in applying the small variable D.-C. voltage of the control system to the driver oscillator to effectuate control of the amplitude of oscillation. Resistor 67 corresponds to the similarly numbered resistor in the voltage divider circuit of Fig. 3. At any instant, the potential of the lead 22 connecting this resistor to the control grid of the first amplifier tube 77 is equal to the sum of the negative divided voltage and the voltage due to the standard battery 69. The latter battery is preferably tapped in steps and constitutes the main control of the high potential output.

The filament of the first amplifier tube 77 is connected to a regulated current source, which may be of the type illustrated in Fig. 8 and hereinafter described, in order to assure constant electron emission. Screen grid potential is obtained from a voltage divider 79—81 connected to a suitable source of positive potential which is applied to terminal 83. Plate voltage is obtained from a resistor 105 connected between the plate and the terminal 83. The plate is connected to the control grid of the second amplifier tube 85 through a parallel connected resistor 87 and capacitor 89. A phase control network comprising resistor 91 and capacitor 93 is connected in shunt with the plate of the amplifier tube 77. Screen grid potential for the second amplifier tube 85 is derived through a dropping resistor 95 from a suitable source of positive potential which is connected to a terminal 97. A gas filled regulator tube 99 is utilized to control the screen grid potential. The anode of the output tube 85 is connected through an anode load resistor 101 to the positive supply terminal 83 and also through an isolating resistor 103 to the screen grid of the second oscillator tube V4, which is shown in Fig. 4.

It will be noted that the plate voltage of the first amplifier tube 77 is impressed on the grid of the second amplifier tube 85 through the coupling resistor 87. Since the cathodes of the two amplifier tubes are both operated at ground potential, it is necessary to overcome the effect of the plate voltage on the grid of the second amplifier. This is accomplished by connecting a source of negative voltage, for example, —350 volts derived from the voltage supply 31 illustrated in Fig. 1, through an isolating resistor 107 to the control grid of the output tube. This has an effect similar to that of the usual series bucking battery in D.-C. amplifiers, but has the advantage that one terminal of the source of negative voltage is operated at ground potential, which is not true in the conventional case.

It has also been found that it may be desirable to drive the screen grid of the oscillator tube more negative than is possible by direct control from the amplifier tube 85. This is accomplished by connecting the —350 volt source to the lead 109 through a resistor 111, thus reducing the average potential of the screen and making it possible to drive the screen more negative when the output tube 85 is drawing maximum plate current.

*Protective circuit*

It has been found that, due to the high voltage used, there is some danger of arcing at the high voltage terminals. This may occur within the vacuum chamber of the microscope, due to a failure of the vacuum, for example, or it may occur by reason of a failure of the insulation of the high voltage condensers.

Referring to Fig. 3, it will be noted that the ground return of the high voltage supply flows through the output current meter A. In order to protect the meter from danger, a protective circuit 62 has been provided which absorbs sudden current surges and limits the current to substantially the normal value. In order to protect the apparatus from sustained overloads, a cutout or overload relay 60 has been provided. The details of the protective circuit and overload relay are illustrated in Fig. 6, to which reference is now made.

Transformer 115 corresponds to the similarly numbered transformer of Fig. 3 which supplies 60 cycle alternating current to the first high voltage rectifier tube V1. The ground return is made through resistors 117, 119, 121, meter A, resistor 123, the energizing coil of an overload relay 125 and a resistor 127. A neon regulator tube 129 and a pair of condensers 131 and 133 are connected between the output terminals of the meter A and the junction points of the resistors 117, 119 and 121, respectively. The output terminal of the meter A is also connected to ground through a limiting neon tube 135.

The overload relay circuit includes a switch 139 which, in its normal position, makes contact to a grounded terminal 141. When actuated by an overload current, the relay armature makes contact to a terminal 143 which is connected to a source of negative voltage, for example, the —350 volts provided by the power supply 31. The armature is connected to the grid return of the oscillator tubes of the driver oscillator as illustrated in detail in Fig. 4. The armature is also connected through a push button 147 to the relay coil through a current limiting resistor 149. The same armature is also connected to a voltage divider 151 across a portion of which a neon indicator tube 153 is connected.

A current surge, caused by an arc or breakdown of a high voltage terminal, flows through the limiting resistors 117, 119 and 121 and charges capacitors 131 and 133. In addition, the voltage across the output meter A is limited by the neon tube 129. The meter is therefore protected from damage. The sustained overload flows through the actuating coil of the relay 125 and connects the armature to the negative potential source, thus removing the normal ground connection and applying a high negative potential to the driver oscillator sufficient to stop its oscillation. Since the driver oscillator provides the high voltage for the high voltage rectifier system, it will be apparent that the relay immediately shuts off the high voltage supply. At the same time, the relay connects a holding circuit through the push button 147 so that current flows through a resistor 155 and through the relay to hold it in its closed position. It will remain in this position until the circuit is broken by operating the push button 147. If the fault has cleared, the overload relay will open, restoring the high voltage to the rectifiers. If the fault has not cleared, the high voltage will not remain on, indicating that the circuit must be checked. When the overload relay is actuated, the neon output indicator 153 will light, thus providing a visual indication to the operator that the high voltage has been cut off.

*Low voltage or current regulators*

A current regulator of the type preferred for use with the projection and objective coils of the microscope is illustrated in Fig. 7. A conventional rectifier 157 and filter 159 supply a high voltage to the plate of a triode 161, the cathode of which is serially connected to ground through the projection or objective coil 163 and current control resistors 165 and 167, the former being adjustable. The voltage drop across the latter resistors is compared to the voltage of a standard battery 169 and applied, through a relatively high resistance 170, to the grid of a regulating tube 171, the plate of which is energized by a suitable source of positive potential connected to an input terminal 173 through a plate resistor 175. The plate of this control tube is connected to the grid of the triode 161 through a coupling resistor 177. A by-pass capacitor 178 is connected between the grid of the regulating tube 171 and the cathode of the triode 161. The high resistance 170 and the by-pass capacitor 178 thereby comprise a filter for eliminating from the regulator output circuit substantially all objectionable hum and all except extremely low frequency noise components. The filter 170, 178 in effect provides voltage regulation of A.-C. components in the circuit.

It will be observed that the cathode of the triode 161 is positive with respect to ground. However, the plate of tube 171 cannot become sufficiently less positive than the cathode of tube 161 to provide the necessary bias for the latter tube under conditions of low output current. In order to supply the proper voltage to the grid of the tube 161, it is connected through an isolating resistor 179 to the source of regulated negative voltage, as in the case of the D.-C. amplifier described above.

A current regulator of somewhat simpler form which does not require a standard battery is illustrated in Fig. 8. This amplifier is preferably used for the condenser coil of the microscope and may also be used to regulate the filament current of the D.-C. amplifier and the control tube 171 of the current regulator illustrated above in Fig. 7. The unit may also be considered as a voltage regulator since the voltage across a constant impedance is constant when the current through it is constant. Consequently, the same control circuit is employed, for example, in regulating the output of the regulated 800 volt power supply 11.

As before, the conventional rectifier and filter 157 and 159 are connected to the plate of a limiting triode 161, the cathode of which is connected to ground through the electron microscope condenser coils or the regulated filament, as the case may be, and through the control and adjusting resistors 165 and 167. The voltage drop across the latter resistors is compared to a voltage derived from the regulated −350 volts obtained from the power supply 31, thus eliminating the standard batteries 169 utilized in the preceding regulator. A particular advantage of this method is that the standard voltage source is operated with one terminal grounded, which is not possible where standard batteries are used in a series circuit. Since the cathode of the triode 161 is positive with respect to ground, as noted above, it may not be necessary to apply the auxiliary negative potential to the grid of this tube so that in this case the plate of the control tube 171 is connected directly to the grid of the triode 161. It will be apparent that in both cases, changes in the current through the coil and control resistors produces a variable voltage drop across the resistors which is applied to the control tube 171 to vary the amplitude of the current in a direction tending to compensate for the change.

The measured stability of the power supply system herein described has been found to be well in excess of that required for stability and definition of an electron microscope. Several hundred photomicrographs have been successfully taken with no indication that the results have been limited by variations of the power supply. This is in distinct contrast with microscopes of the prior art in which a large percentage of the photomicrographs is spoiled by reason of changes in the power supply voltage. The system is so stable that the microscope may be reset to previous conditions without observing the electron image or the focusing. Exposures thus made have good resolution. In addition, it is possible to make wide variations of the image intensity without changing the focus.

A particularly severe test which was successfully passed by the electron microscope operated in conjunction with the power supply and control system of the present invention is that of reducing the vacuum during operation until an internal arc takes place, causing the overload relay to actuate, then restoring the vacuum, and applying the high voltage to obtain the original picture exactly in focus without readjustment. Previously known microscopes could not be treated in this manner and generally had to be taken apart and repaired after an internal flashover due to the severity of the discharge from the filter.

I claim as my invention:

1. A current regulator comprising a source of direct current, a load device, an electron discharge device having cathode, anode and grid electrodes, said anode and cathode electrodes being connected in series circuit with said load device and said source, said series connection also including a series impedance, a control tube having cathode, grid and anode electrodes, means coupling the grid and cathode of said control tube in shunt with all of said impedance, said grid of said control tube being connected to the positive terminal of said impedance, means conductively coupling the anode of said control tube to the grid of said discharge device, means for applying a positive potential to said anode electrode of said control tube, and a network connected to said grid of said control tube for suppressing A.-C. potentials across said impedance.

2. A current regulator comprising a source of direct current, a load device, an electron discharge device having cathode, anode and grid electrodes, said anode and cathode electrodes being connected in series circuit with said load device and said source, said series connection also including a series impedance, a control tube having cathode, grid and anode electrodes, means coupling the grid and cathode of said control tube in shunt with all of said impedance, said grid of said control tube being connected to the positive terminal of said impedance, means conductively coupling the anode of said control tube to the grid of said discharge device, means for applying a positive potential to said anode electrode of said control tube, separate means for applying a negative potential to the grid of said discharge device to compensate for the positive voltage applied thereto through said control tube anode coupling means, and a network connected to said grid of said control tube for suppressing A.-C. potentials across said impedance.

ARTHUR W. VANCE.

REFERENCES CITED

The following references are of record in the file of this patent:

UNITED STATES PATENTS

| Number | Name | Date |
|---|---|---|
| 1,858,271 | Harness | May 17, 1932 |
| 2,075,966 | Vance | Apr. 6, 1937 |
| 2,117,138 | Bock | May 10, 1938 |
| 2,210,394 | Braden | Aug. 6, 1940 |

FOREIGN PATENTS

| Number | Country | Date |
|---|---|---|
| 472,326 | British | Sept. 22, 1937 |